(No Model.)

W. A. HENDERSON.
PIPE CLAMPING DEVICE.

No. 431,054. Patented July 1, 1890.

WITNESSES.
F. L. Loving
H. Selden Loving

INVENTOR.
William A. Henderson
by Chas. M. Reed
atty.

THE NORRIS PETERS CO., PHOTO-LITHO., WASHINGTON, D. C.

UNITED STATES PATENT OFFICE.

WILLIAM A. HENDERSON, OF MALDEN, MASSACHUSETTS.

PIPE-CLAMPING DEVICE.

SPECIFICATION forming part of Letters Patent No. 431,054, dated July 1, 1890.

Application filed February 26, 1890. Serial No. 341,785. (No model.)

*To all whom it may concern:*

Be it known that I, WILLIAM A. HENDERSON, of Malden, in the county of Middlesex and State of Massachusetts, have invented certain new and useful Improvements in Pipe-Clamping Devices, of which the following is a specification.

My invention relates to pipe-clamping devices; and it has for its object to clamp two pieces of pipe and to force and hold them with their adjacent ends bearing upon each other, so that when the ends of the pipe are melted, or solder is applied to join the two pipes, there will be a continuous bearing of such ends together to make a tight and firm joint.

My invention consists, generally, of two clamps, one for each of the two pieces of pipe to be joined, said clamps being connected by springs the resilience of which tends constantly to force the two clamps toward each other, and means for separating said clamps against the action of said springs and for immediately releasing the clamps to the action of the springs, all as more particularly hereinafter described.

Figure 1:
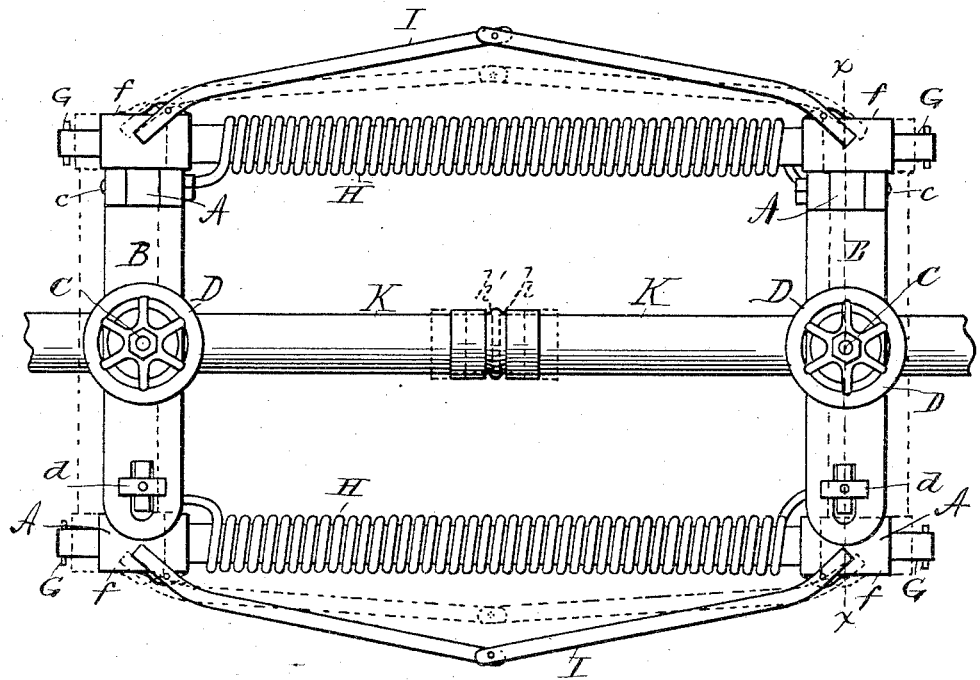
Figure 2:
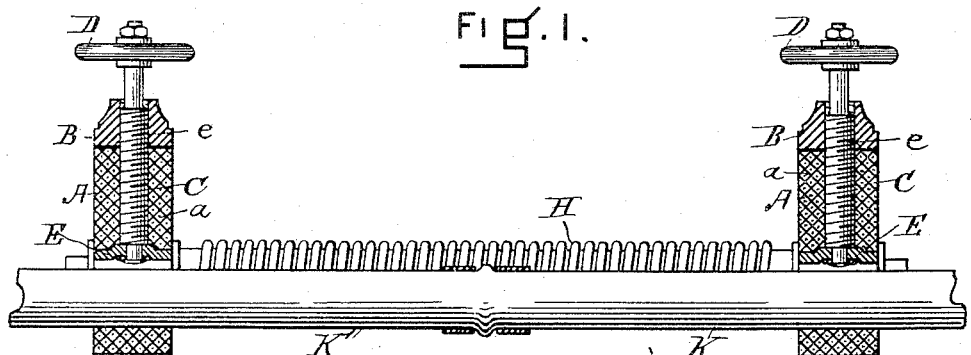
Figures 3, 4:
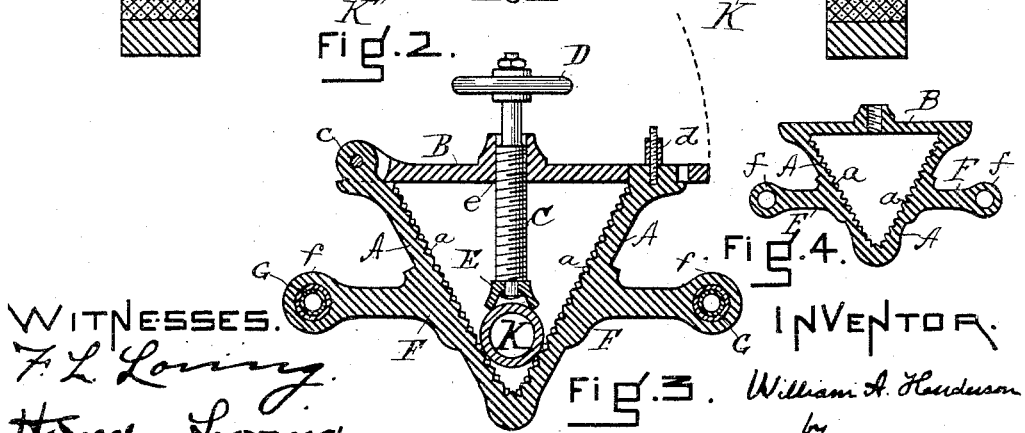

In the accompanying drawings, Figure 1 illustrates a plan view of my improved clamping device, the dotted lines showing the position the parts will assume when the clamps are separated against the action of the spring. Fig. 2 is a longitudinal section, and Fig. 3 is a transverse section, through the line $x\ x$ of Fig. 1 or through one of the clamps and its hinged top. Fig. 4 is a detail of a modification.

Similar letters represent like parts in all the figures.

A A are two V-shaped pieces of metal, each of which is toothed or roughened upon its two inner faces, as at $a$. A bar B joins the two sides of each of the pieces A, and with them forms an inverted triangle. This bar B is hinged at $c$ to one of the arms of A, and is adapted to be clamped to the other arm by any appropriate catch—as, for example, by a pivotal button $d$, passing through an opening or slot in the bar B, and turning across said opening.

C is a screw which passes through the bar B at or near its center and engaging with an internal screw-thread $e$ in said bar. The upper end of each of the screws C is provided with a handle D, by which the screw can be turned, and the lower end of each screw is provided with a small inverted-V-shaped piece E, which piece is loosely pivoted to the end of said screw.

The above constitute the two clamps for holding the two pieces of pipe to be joined, said pipes being adapted to be held between the V-shaped pieces A and E, as shown in Fig. 3.

Extending from each side of the pieces A A is a lateral arm F, and each of these arms is provided with a horizontal tubular portion $f$.

G G are two rods, which pass through the corresponding tubes $f$ of the two clamps and connect said clamps, as well as separate them from each other, a cross pin or flange or any other projection on the end of each rod G serving to prevent the clamps from becoming disconnected from each other and from said rod. A coil-spring H encircles each rod G, and is connected at each end to the tubes $f$, and the resilience of said spring tends constantly to force the clamps toward each other. The rod G acts as a guide to prevent the spring H from sagging and to keep the two clamps in line, the tubular portions $f$ constituting sleeves for sliding upon said rod.

I I are two toggle-joints, the ends of each of which are loosely pivoted to the corresponding sleeves $f f$ of the two clamps. By pressing inward or straightening the toggle-levers I I the two clamps will be separated against the action of the springs H H, and when said toggle-joints are released the resilience of the springs will tend to bring the clamps toward each other, as before.

If it be desired to connect two ends of two pieces of pipe K K′, the toggle-joints I I should be pressed inward against the springs H H, thus separating the two clamps, as shown in dotted lines in Fig. 1, and the two pieces of pipe K K′ should then be inserted in the clamps between the V-shaped pieces A and E, with the adjacent ends of said pipes a slight distance apart, as shown in dotted lines in Fig. 1. The pieces E should be screwed down tight enough upon the pipes so as to force the teeth $a$ into the same to prevent the pipes from slipping, when the springs are allowed to act upon the clamps. The toggle-joints I I are then released, and the resilience of the springs H H will force the two clamps toward each other, and the ends $h\ h'$ of the pipes K K' will also be forced tightly against each other, and ready to be joined in any well-known manner during such continuous pressure of said ends upon each other.

The two pieces A and B of the clamps may be made all in one piece, if desired, as shown in Fig. 4; but I prefer to make them with the top B hinged, as shown in Figs. 1, 2, and 3, in order to allow the pipes to be dropped between the sides of the V-shaped pieces A A.

What I claim as new, and desire to secure by Letters Patent, is—

1. A clamping device for forcing the ends of two pieces of pipe together, consisting of two clamps connected by springs and a toggle-joint also connecting the two clamps and adapted to force the same apart against the resilience of the spring or springs, all as set forth.

2. A clamping device for forcing the ends of two pieces of pipe together, consisting of two clamps connected by coil-springs, a loose rod passing through each of said springs and through sleeves attached to the clamps, and a toggle-joint also connecting the two clamps and adapted to force the same apart against the resilience of the spring or springs, all as set forth.

WILLIAM A. HENDERSON.

Witnesses:
JAMES CORCORAN,
CHAS. M. REED.